(12) United States Patent
Gaur et al.

(10) Patent No.: US 11,751,724 B1
(45) Date of Patent: Sep. 12, 2023

(54) WICK-START CHARCOAL PORTABLE GRILL

(71) Applicant: Siddhartha Gaur, Plano, TX (US)

(72) Inventors: Siddhartha Gaur, Plano, TX (US); Vibha Bansal, Plano, TX (US); Mansi N. Gaur, Plano, TX (US); Rupam Bala, Plano, TX (US)

(73) Assignee: Siddhartha Gaur, Plano, TX (US)

( * ) Notice: Subject to any disclaimer, the term of this patent is extended or adjusted under 35 U.S.C. 154(b) by 282 days.

(21) Appl. No.: 17/220,528

(22) Filed: Apr. 1, 2021

Related U.S. Application Data

(60) Provisional application No. 63/018,228, filed on Apr. 30, 2020, provisional application No. 63/003,297, filed on Apr. 1, 2020.

(51) Int. Cl.
    *A47J 37/07* (2006.01)

(52) U.S. Cl.
    CPC ....... *A47J 37/0763* (2013.01); *A47J 37/0704* (2013.01); *A47J 37/079* (2013.01)

(58) Field of Classification Search
    CPC ... A47J 37/0763; A47J 37/0704; A47J 37/079
    See application file for complete search history.

(56) References Cited

U.S. PATENT DOCUMENTS

| | | | | |
|---|---|---|---|---|
| 4,531,506 A | * | 7/1985 | Chambers | A47J 37/0768 126/25 R |
| 5,293,859 A | * | 3/1994 | Lisker | A47J 37/0768 99/449 |
| 5,638,743 A | * | 6/1997 | Lo | A47J 37/0763 99/449 |
| 2007/0277800 A1 | * | 12/2007 | Chiang | A47J 37/0704 126/50 |
| 2011/0132347 A1 | * | 6/2011 | Kim | A47J 37/0763 126/25 R |
| 2019/0239688 A1 | * | 8/2019 | Brøgger | A47J 37/0768 |
| 2019/0290068 A1 | * | 9/2019 | Laks | A47J 37/0768 |

* cited by examiner

*Primary Examiner* — Alfred Basichas
(74) *Attorney, Agent, or Firm* — John W. Montgomery

(57) ABSTRACT

A portable charcoal barbeque grill is disclosed with self-contained charcoal briquettes and an upper grill for cooking. The barbeque grill may be constructed with a starter wick having relatively low ignition-temperature for easy lighting. The wick also has a sufficiently high burning temperature either to ignite charcoal briquettes or to ignite a starter material which in turn has a starter-material-burning-temperature sufficiently high to ignite the charcoal briquettes.

1 Claim, 7 Drawing Sheets

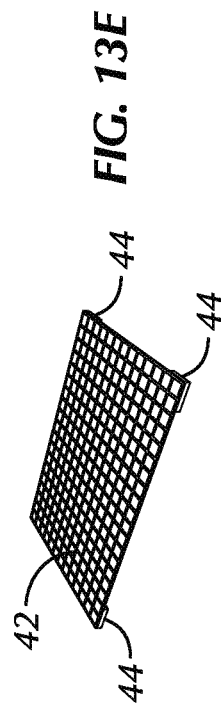
FIG. 13A
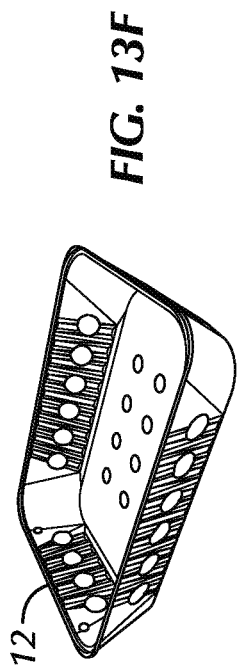
FIG. 13B
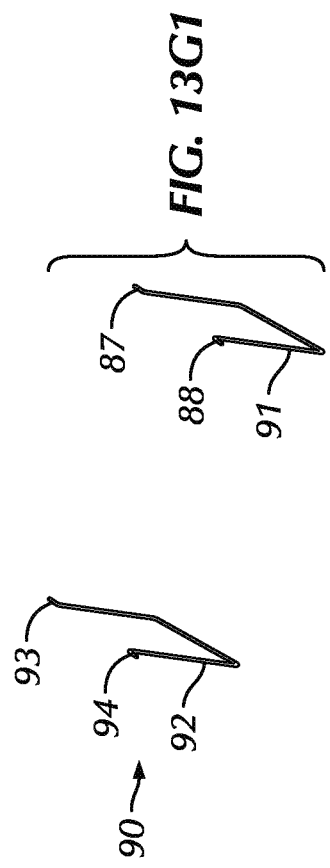
FIG. 13C
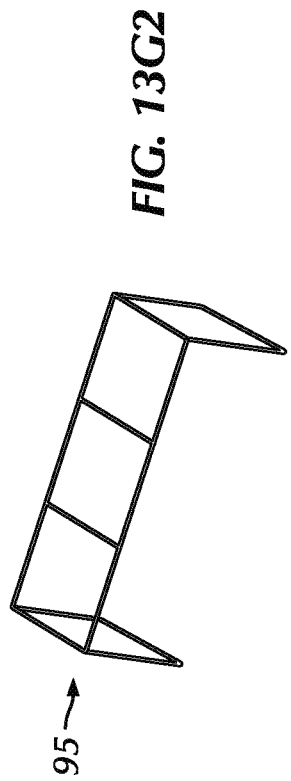
FIG. 13D
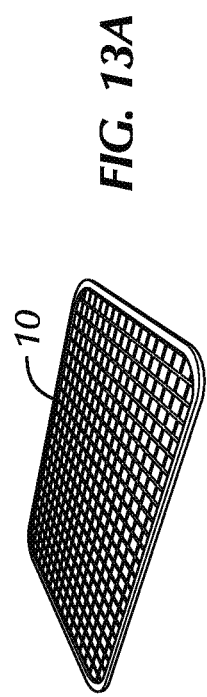
FIG. 13E
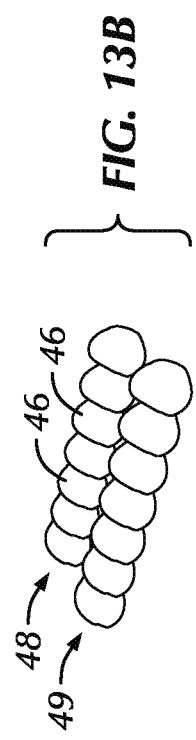
FIG. 13F
FIG. 13G1
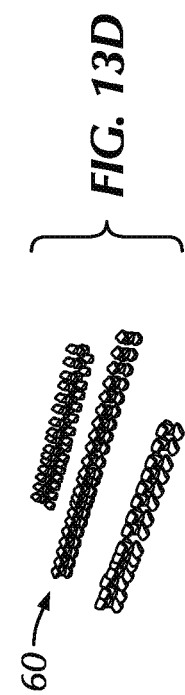
FIG. 13G2

WICK-START CHARCOAL PORTABLE GRILL

CROSS-REFERENCE TO RELATED APPLICATIONS

This application claims the benefit under 35 U S.C. § 119(e) to U.S. Provisional Patent Application Ser. No. 63/003,297, filed on Apr. 1, 2020, and claims the benefit of under 35 U S.C. § 119(e) to U.S. Provisional Patent Application Ser. No. 63/018,228, filed on Apr. 30, 2020. U.S. Provisional Patent Applications Ser. Nos. 63/003,297 and 63/018,228 are incorporated herein by reference in their entireties, including all drawings and exhibits.

BACKGROUND OF INVENTION

Background

Currently, there are bags of charcoal briquets that have been soaked in otherwise infused with a liquid for accelerating the lighting of the briquettes. The accelerant evaporates from the charcoal to assists with lighting when the charcoal is placed in an existing barbeque grill. There are also existing barbeque grills for receiving charcoal and that may be ignited, typically by pouring a starter fluid or liquid accelerant onto the charcoal briquettes before igniting the accelerant.

BRIEF DESCRIPTION OF DRAWINGS

FIG. 13F is a perspective view showing a metal tray for the construction of a portable charcoal grill in accordance with one or more embodiments.

FIG. 13 is an exploded assembly view showing the construction of a portable charcoal grill, in accordance with one or more embodiments, with parts of the portable grill shown in FIGS. 13A, 13B, 13C, 13 D, 13E, 13F, and alternative constructions in 13G1 and 13G2.

SUMMARY OF THE INVENTION

Figure 1:
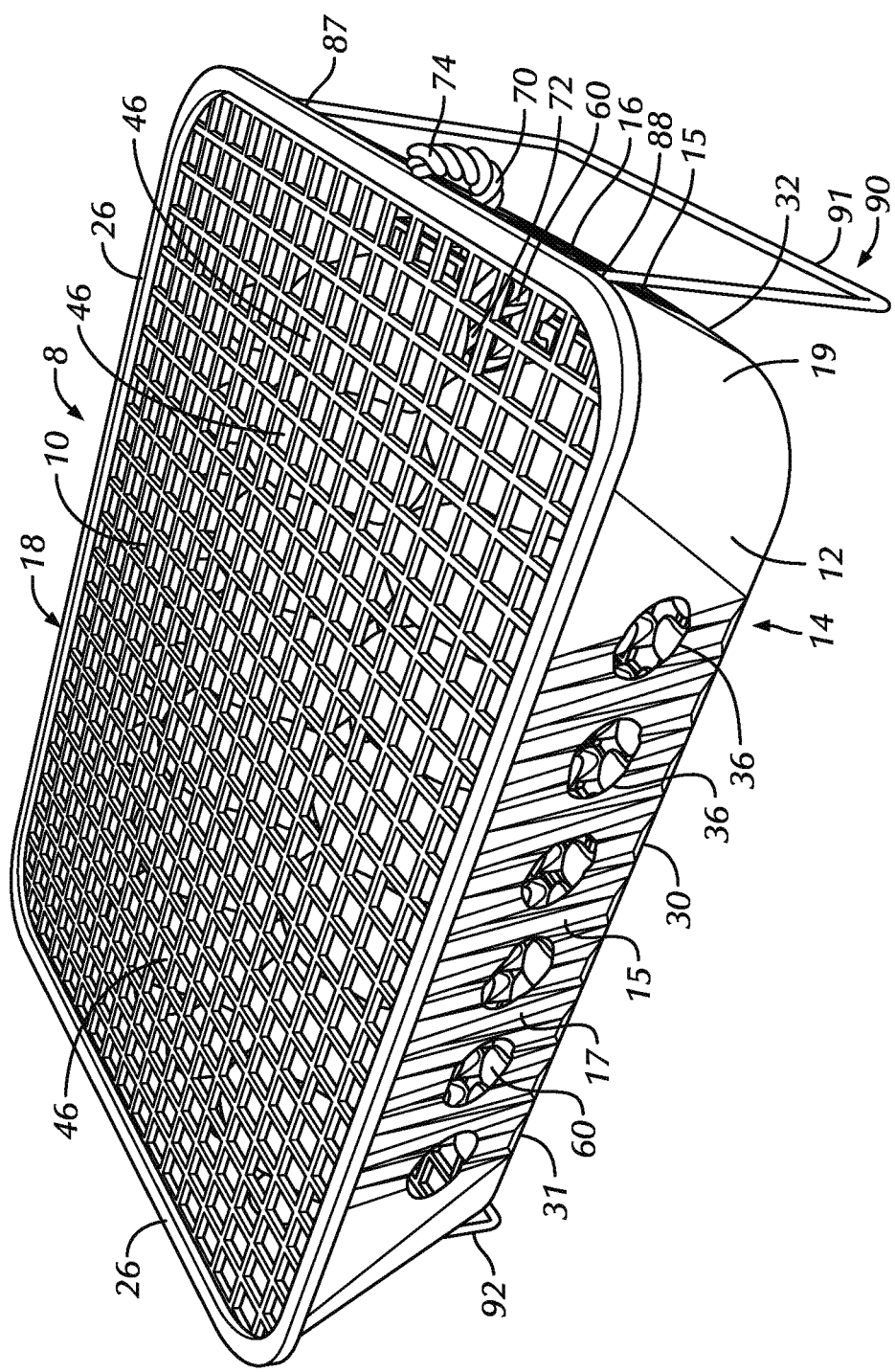
FIG. 1 shows a perspective view of a portable charcoal grill in accordance with one or more embodiments.

According to one or more embodiments a portable charcoal grill is disclosed comprising a metal tray having a base pan. There are sidewalls connected to the base pan and projecting upwardly from the base pan. A plurality of airflow holes are formed at spaced apart locations through the base pan. A plurality of air vent holes are formed through the sidewalls at spaced-apart locations. A lower grill extends along and parallel to the base pan inside the upwardly extending sidewalls. a plurality of charcoal briquettes are provided within the metal tray of the portable charcoal grill. According to one embodiment or more embodiments of the invention, the plurality of charcoal briquettes all have a substantially uniform size and shape. There is a known charcoal ignition temperature and a charcoal burning rate. According to one or more embodiments, the plurality of briquettes are positioned by a support grill having troughs and ridges, in at least one row of charcoal briquettes. The at least one row of charcoal briquettes extends between opposite sidewalls. According to one or more embodiments, at least one ignition wick is provided extending a length into the metal tray and adjacent to the at least one row of charcoal briquettes. A portion of the at least one ignition wick extends out of the metal tray, and the at least one ignition wick has a wick-burning temperature higher than the charcoal ignition temperature. A quantity of starter material is packed around the charcoal briquettes to support the plurality of briquettes spaced-apart from each other in the at least one row. The starter material supports each of the plurality of charcoal briquettes in a position spaced-apart from the sidewalls and above the support grill. The starter material has a starter material ignition temperature lower than the burning temperature of the wick and a burning temperature higher than the charcoal ignition temperature. A cooking grill is supported by the sidewalls substantially parallel to the base pan and positioned above the at least one row of charcoal briquettes. The cooking grill is secured to the side walls above the starter material, the charcoal briquettes, and the support grill in the metal tray.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While the various steps in the various figures are presented and described sequentially, one of ordinary skill will appreciate that some or all of the steps may be executed in different orders, may be combined or omitted, and some or all of the steps may be executed in parallel. Furthermore, the steps may be performed actively or passively.

In general, embodiments of the invention are directed to a portable charcoal barbeque grill 8 with self-contained charcoal briquettes 46 as fuel and an upper grill 10 for cooking. In one or more embodiments the barbeque grill 8 may be constructed with an ignition wick 70 having relatively low wick-ignition-temperature for easy lighting and having a sufficiently high burning temperature either to ignite charcoal briquettes 46 or to ignite a starter material 60 which in turn has a starter-material-burning-temperature sufficiently high to ignite the charcoal briquettes 46. In one or more embodiments a portable charcoal barbeque grill 8 with a wick 70, charcoal 46 and starter material 60 is disclosed which provides for easy wick-starting and long duration burning of the charcoal 46.

FIG. 1 shows a perspective view of a portable charcoal barbecue grill 8 in accordance with one or more embodiments. A barbecue grill 8 is disclosed comprising a top grill 10 for cooking, a metal tray 12 having a base pan 14, sidewalls 15 connected to or integrally formed with the base pan 14 and projecting upwardly from the base pan 14. The top grill 10 is supported from the sidewalls 15 of the base pan 14. A plurality of airflow holes 20 are formed at spaced apart bottom locations through the bottom 11 base pan 14. A plurality of air vent holes 36 are formed through the sidewalls 15 at spaced apart side locations. A lower support grill 40 extends along and substantially parallel to the bottom 11 of the base pan 14. The lower support grill 40 is positioned above spaced above the bottom 11 of the base pan 10 and inside the upwardly extending sidewalls 15.

Figure 2:
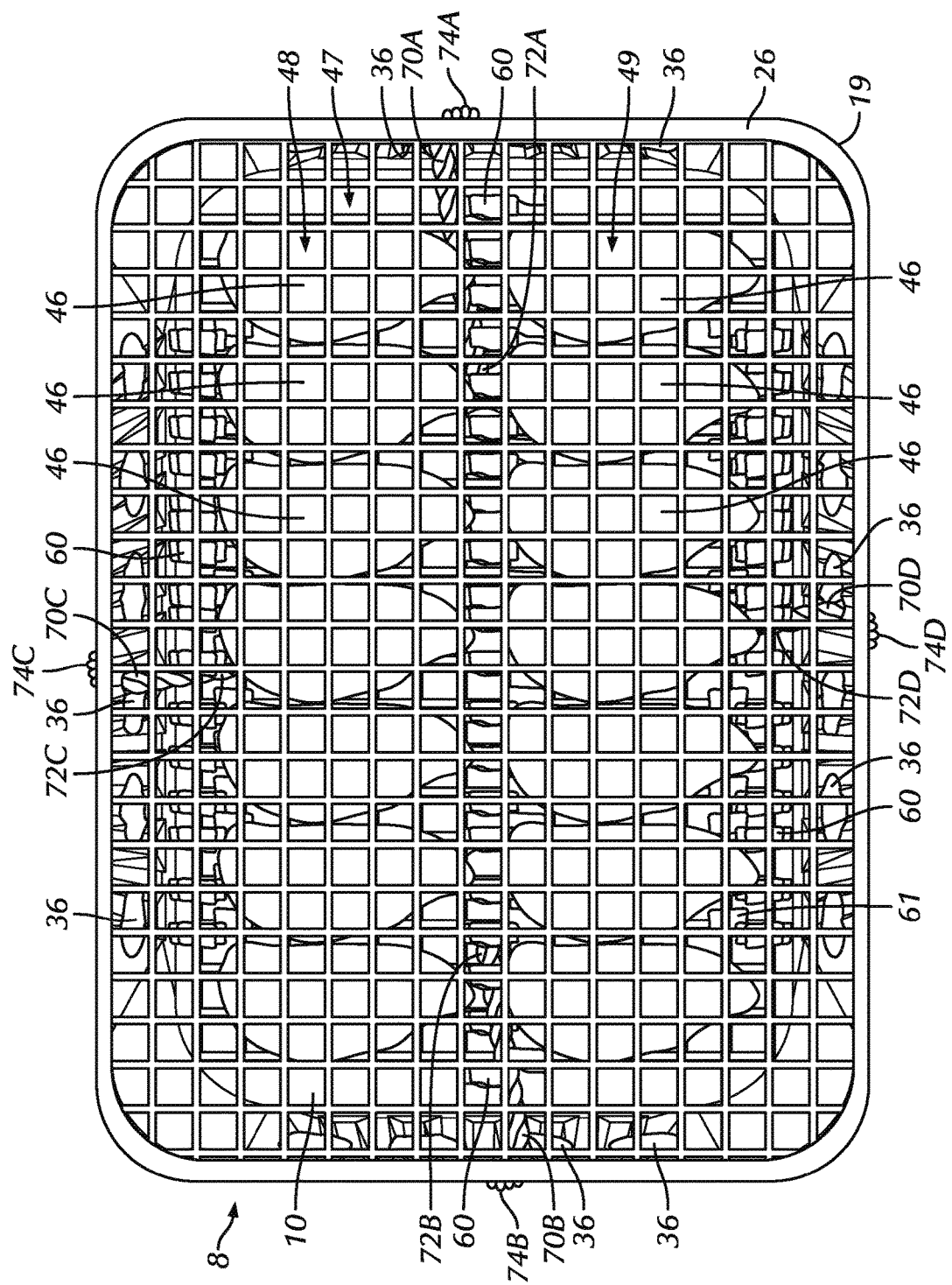
FIG. 2 shows a top plan view of a portable charcoal grill in accordance with one or more embodiments.
Figure 3:
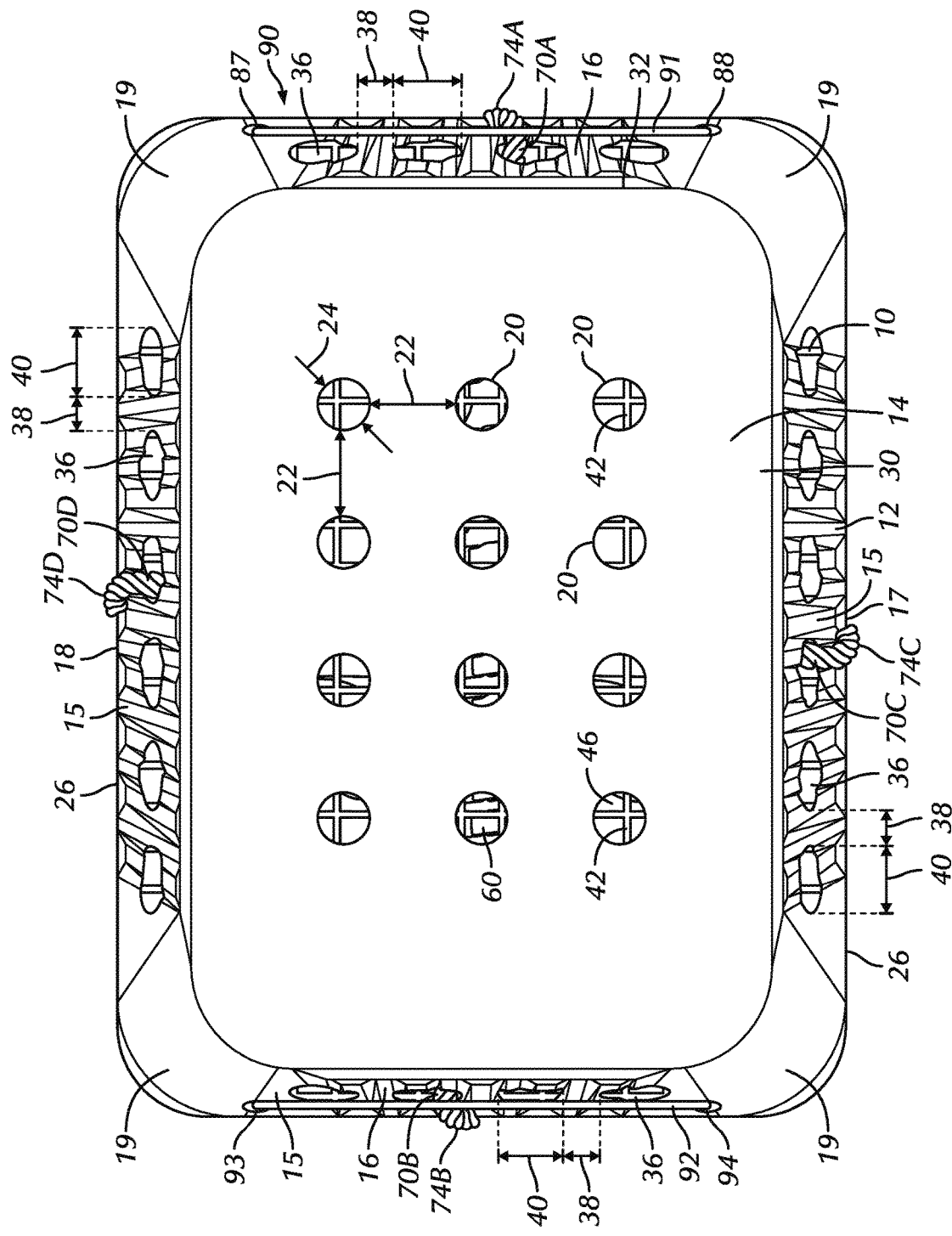
FIG. 3 shows a bottom view of a portable charcoal grill in accordance with one or more embodiments.

One or more embodiments of the invention may be more fully understood with reference also to the top plan view FIG. 2 and to the bottom plan view FIG. 3, showing the embodiment of the portable charcoal grill 8 shown in FIG. 1. This embodiment includes a plurality of charcoal briquettes 46. Preferably the charcoal briquettes 46 each have a substantially uniform size and shape, a charcoal ignition temperature, and a charcoal burning rate. The each of the plurality of charcoal briquettes 46 are positioned on and above the lower support grill 40. The charcoal briquettes are supported above the base pan 14 by the lower support grill 42 and may be beneficially positioned in at least one row 48 of substantially uniformly arranged charcoal briquettes 46. The at least one row 48 of charcoal briquettes 46 preferably extends between opposite sidewalls 15 of the metal pan 12. At least one ignition wick 70 extends a length 72 along the lower grill 40 and adjacent to at least a portion of the at least one row 48 of charcoal briquettes 46. The ignition wick 70 has an exposed portion 74 extending out of the metal pan 12. The ignition wick 70 preferably has a wick-ignition temperature relatively lower than the charcoal ignition temperature and a wick-burning temperature that is higher than the charcoal ignition temperature. A quantity of starter material 60 is packed around and above the ignition wick 70 and among and between the one or more of the plurality of charcoal briquettes 46 in the at least one row 48 of charcoal briquettes 46. The starter material 60 is preferably composed of a multiplicity of burnable pieces 61. Beneficially, at least a portion of the burnable pieces 61 may have a minimum size that is larger than the spacing or mesh hole sizes in the lower grill 14. For example, the starter material 60 may include wood chips, wood fiber, compacted saw dust pellets, other burnable cellulose material, and etc. the may be beneficially composed of pieces that relatively smaller than charcoal briquettes and slightly larger in at least one cross-sectional dimension to resist falling through the lower grill 14 and the air vent holes 20 and air flow holes 36. The starter material 60 is packed sufficiently tightly to support the plurality of briquettes 40 slightly spaced-apart from each other and with air spaces or porosity to allow air to flow through the starter material and around the briquettes 40. The starter material 60 is also packed around the briquettes 40 to support the at least one row 48 of briquettes 40 at a position above the lower grill 42 and contained within the sidewalls 15 of the tray 12. The starter material 60 beneficially has an ignition temperature (the starter-material-ignition-temperature) which is less than wick burning temperature and has a starter material burning temperature that is higher than the charcoal-ignition-temperature.

An upper cooking grill 10 is supported by the sidewalls 15 substantially parallel to the base 14 of the metal pan 12. The upper cooking grill 10 is positioned above the at least one row 48 of the plurality of charcoal briquettes 46. The upper cooking grill 10 is secured to the side walls 15 to hold the starter material 60, the plurality of charcoal briquettes 46, and the lower grill 42 all within the metal tray 12. In one or more embodiments the wick 70 and the starter material 60 may be secured in place relative to the base 14 of the metal pan 12 and the plurality of charcoal briquettes 46 for shipping and to avoid compaction of the air spaces or porosity through the starter material during shipping of the portable barbeque grill 8. For one example, a bonding material 61 such as wax that is solidified at room temperature and that has a low ignition temperature and a higher burning temperature, greater than the ignition temperature of the starter material 60, may be used to hold the components in place. For example, in a process according to one embodiment of making the portable barbeque grill 8, the components including the wick 70, the starter material 60, and the briquettes 46, and the lower grill 42 may be physically positioned relative to each other within the lower tray 14. A bonding material 61, such as melted wax may be poured and then allowed to cool and solidify at various contact junctures between the wick 70, starter material 60, the briquettes 46, and the lower tray 12. The wax solidifies between the different components to hold the wick 70, starter material 60, and briquettes 46, relative to lower grill 42 and in a desired initial position within the tray 12. Upon ignition and burning of the wick 70, the starter material 60 and the wax bonding material 61 will ignite and will burn to further facilitate providing the heat at a temperature that will ignite the charcoal briquettes 46.

According to one or more embodiments the portable charcoal grill 8 may be is self-contained and may be provided within a shipping package such as plastic wrapping, a cardboard box, both plastic and cardboard or another form of packaging. Beneficially the shipping container may also be sealed to hold starter material fines and charcoal dust as might shake free from the barbeque grill 8 constructed and packed with the starter material 60 charcoal briquettes 46. For example, the entire barbeque grill 8 may be removably inserted into a cardboard box, corresponding in size and shape to the barbeque grill 8 and generally resembling a large breakfast cereal box. The box may be sealed with the barbeque grill 8 inside, such as with glue on folded flaps or with a thin plastic sheet shrink wrapped either around the outside of cardboard box. In one or more other embodiments the portable charcoal grill 8 may be sealed using shrink wrap plastic or other plastic sheet material for shipping, without a cardboard box. In one or more alternative embodiments the barbeque grill 8 may be wrapped with plastic or with paper and also inserted into a cardboard box for shipping.

To use the portable charcoal barbeque 8 for cooking, one can remove any packaging from the portable barbeque grill 8, place the base 14 of tray 12 on an existing barbeque grill of a type having a grill and air ventilation there below (not shown) so that there is air ventilation under the base pan 14 of the portable barbeque grill 8, and away from any other burnable materials or structures. The exposed portion 74 of the wick 70 can be lit with a match, a lighter, or another source of fire so that the exposed portion 74 ignites outside of the metal tray 12. The wick 70 extends through a side opening such as an air flow side vent 36 and burns through the air flow side vent 36 and into the interior of the metal tray 12. The starter material 60 will be ignited by the burning wick 70. The air vents 36 and airflow holes 20 in the base pan 14 allow air to enter into the metal tray 12 and initially provides air and oxygen for burning of the wick 70 and the starter material 60. According to one or more embodiments the burning temperature of the starter material 60 is higher than the ignition temperature of the charcoal briquettes 46. The burning of the starter material at a temperature higher than the ignition temperature of the charcoal briquettes 46, together with burning of the wick 70, ignites the charcoal briquettes 46 on the surfaces of the briquettes 46. The relative heat of the burning wick 70 and starter material 60 increase the air flow upward and through the bottom air holes 20 and side air flow vents 36. In an embodiment with bonding material 61, the bonding material 61 will also burn and contribute to the heat for igniting the briquettes 46 and drawing air in through the bottom holes 20 and side vents 36. Air flow through the bottom holes 20, the side vents 36, between the spaced briquettes 46 and up through the top cooking grill 10 continue to provide oxygen for even ignition and burning of the briquettes 46. In one or more embodiments the spacing 22 and the size 24 of the air vent 20 and the spacing 38 and the size 40 of the air holes 36 are designed to provide an adequate and metered oxygen supply to for burning of the wick 70 and starter materials 60 above the ignition temperature of the charcoal 46 and subsequently to provide a sufficiently high burning temperature and quantity of heat energy from the plurality of briquettes 46 for barbeque style cooking. The heat of the ignited surfaces of the briquettes 46 is maintained and elevated within the tray 12 so that the ignition spreads evenly in a short period of time over the surfaces of the plurality briquettes 46 for substantially uniform cooking on the top cooking grill 10.

According to one or more embodiments the plurality of briquettes 46 are sized and shaped to efficiently provide a large surface area to the air flow provided by the airflow side vents 36 and airflow bottom holes 20. This results in rapid initial ignition of the briquettes 46. The size, volume and burning rate of the charcoal briquettes 46 are determined together with the metered air flow to maintain cooking time greater than about one hour and beneficially up to about three hours. In one or more embodiments the charcoal briquettes 46 are larger than the typical size for charcoal briquettes, for example only, charcoal briquettes 46 may beneficially have dimensions of about 3.0-4.0 inches long, 2.0-2.5 inches wide, and about 1.2-1.7 inches thick with rounded corners. The larger than normal size and volume of the charcoal briquettes 46 beneficially allows them to burn for a long period of time without refueling the portable barbeque grill 8 with additional charcoal. According to one or more embodiment, the configuration of the briquettes 46 having the elongated length and the width dimensions greater than the thickness dimension, beneficially permits the briquettes 46 to be supported on a narrow edge of the charcoal briquettes resting against the lower support grill 42. The narrow contact edge allows maximum air flow around and upward over the relatively large side face surfaces of the briquettes 46 and so that the large surface areas of the briquettes 46 are positioned in a generally vertical orientation within the tray 12. The large area surfaces receive convective air flow thereover so that the briquettes 46 burn evenly. Also, the heated gases follow by convection upward between the closely space surfaces of the plurality of briquettes 46 in the row 48 to facilitate uniform heat to the upper cooking grill 10 along the row 48 of the plurality of briquettes 46. Uniformly ignited surfaces of the row 48 of the plurality of briquettes 46 also provide substantially uniform radiant heating across the cooking grill 10.

FIG. 2 shows a top plan view of a portable charcoal grill 8 in accordance with one or more embodiments. The at least one row 48 of a plurality of briquettes 46, may also comprise two or more of rows of charcoal briquettes 46, such as a first row 47 and a second row 49 of charcoal briquettes 46. To beneficially facilitate rapid and uniform ignition of the starter material 60 and briquettes 46, the wick 70 may comprise a plurality of wicks 70A, 70B, 70C, and 70D, each with an exposed portions 74A, 74B, 74C, and 74D, and lengths 72 A, 72B, 72C, and 72D extending into the starter material 60 and adjacent to the plurality of briquettes 46. All the wicks 70 may be lit in quick succession or substantially at the same time so they al burn into the starter material 60 that surrounds and holds the briquettes 46 in the desired initial positions and orientation for even ignition. The briquettes 46 may beneficially be of size and shape to have large face surfaces that may be oriented approximately vertically relative to the base pan 14 of the tray 12 and relative to the cooking grill 10 in an approximately horizontal orientation.

Figure 2B:
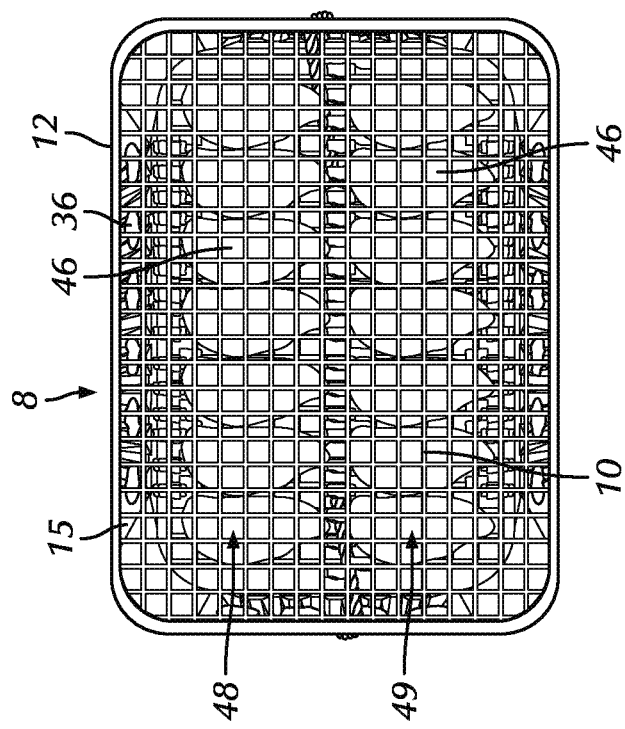
FIG. 2B shows a simplified top plan view of a portable charcoal grill in accordance with one or more embodiments.

FIG. 2B shows a simplified top plan view of a portable charcoal grill 8, according to one or more embodiments, showing sides 15 with air vents 36 and depicting a plurality of briquettes 46 contained within the metal pan 12 and cooking grill 10.

FIG. 3 shows a bottom view of a portable charcoal grill in accordance with one or more embodiments. According to the embodiment depicted an example of the size and spacing of the bottom air holes 20 is shown. In this embodiment the air holes 20 are circular to facilitate ease of manufacture and also to reduce stress rising corners in the metal base 14. The corners 19 of the tray 14 connecting between the sides 15 are rounded to provide strength and to reduce stress rising sharp corners so that light-weight metal material, such as recyclable aluminum, may be used to construct the portable grill 8. The diameter 24 of the holes 20 is substantially the same for each hole 20 and the spacing distance 22 between the plurality of holes 20 is uniform in both side-to-side directions. The diameter and the number of holes 20 is selected to provide adequate air flow for both ignition and for a substantially continuous burning rate and grilling heat production for the quantity and volume of charcoal fuel provides by the charcoal briquettes 46 held within the grill 8 to maintain a cooking temperature and heating duration for more than an hour and up to about 3 hours of barbeque style cooking. The plurality of holes 20 are also in a rectangular shaped pattern similar to the rectangular shape of the base pan 14 of the grill 8 and centered between the sides 15 of the grill 8 and to match with the area occupied by the at least one row 48 of charcoal briquettes 46 provided within the portable grill 8.

Figure 3B:
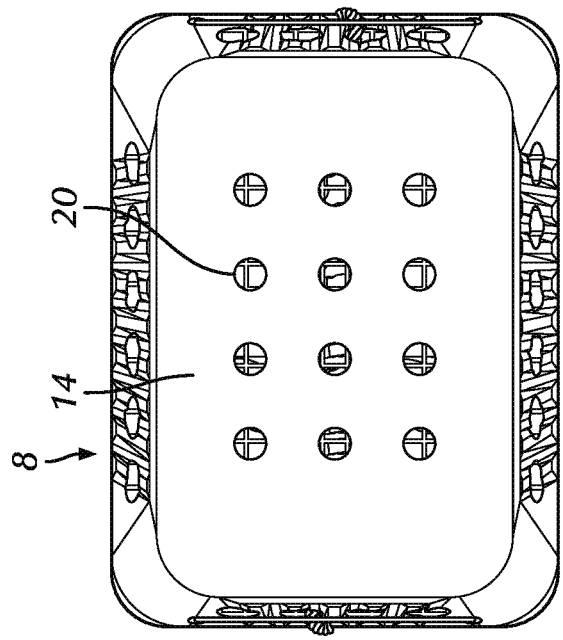
FIG. 3B shows a simplified bottom plan view of a portable charcoal grill in accordance with one or more embodiments.

FIG. 3B shows a simplified bottom plan view of a portable charcoal grill 8, according to one or more embodiments, showing the base pan 14 with air flow holes 20 formed therein.

Figure 4:
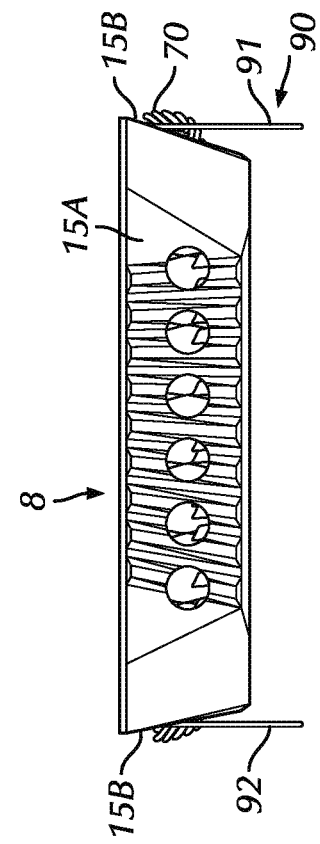
FIG. 4 show a front side view of a portable charcoal grill in accordance with one or more embodiments.

FIG. 4 is a front side view of a portable charcoal grill 8 in accordance with one or more embodiments, showing a front side 15A, and a portion of an ignition wick 70 extending out of an end side wall 15B. A metal support stand 90 is shown according to one or more embodiments formed of legs 91 and 92 attached to the side walls and extending a distance below the bottom of the base pan 14 to provide clearance for good air flow.

Figure 5:
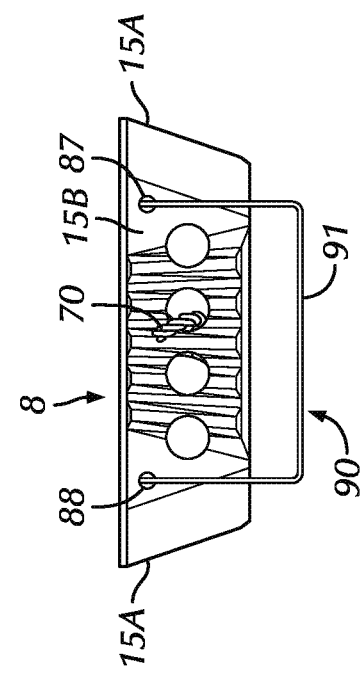
FIG. 5 shows an end side view in accordance with one or more embodiments.

FIG. 5 is an end side view of a portable charcoal grill 8, in accordance with one or more embodiments, and showing a leg 91 of the metal support stand 90 with connections 87 and 88 for securing the leg to the end side wall 15B.

Figure 6:
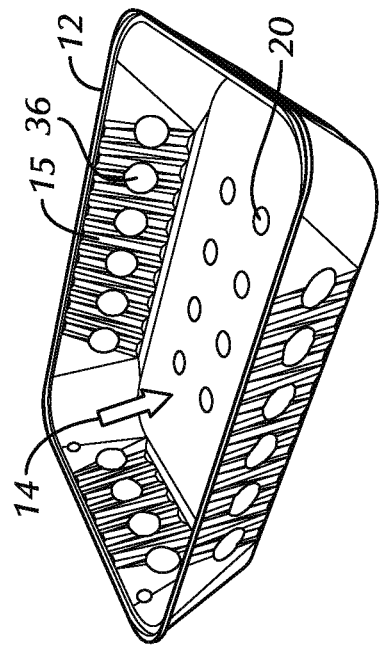
FIG. 6 is a perspective view of a component for assembly of a portable charcoal grill showing a metal tray in accordance with one or more embodiments.

FIG. 6 is a perspective view of a component for assembly of a portable charcoal grill 8, according to one or more embodiment. A metal tray 12 is shown with side walls 15 having air vents 36 formed therein and a base pan 13 with air flow holes 20 formed therein.

Figure 7A:
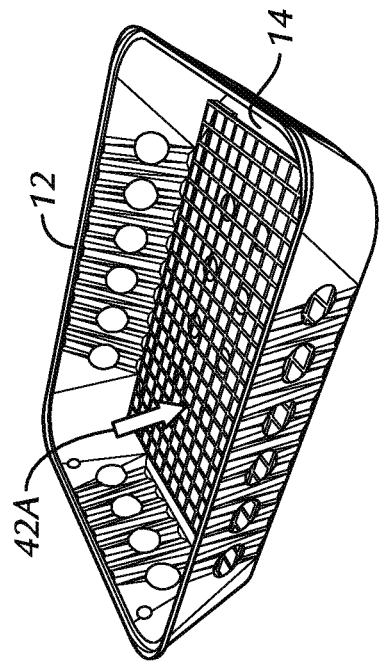
FIG. 7A is a perspective view of a first alternative component for assembly of a portable charcoal grill showing a first alternative lower metal support grill in accordance with one or more embodiments.

FIG. 7A is a perspective view of a first alternative component for assembly to form a portable charcoal grill 8, according to one or more embodiment. A lower metal support grill 42A is inserted into the tray 12 and positioned spaced above and substantially parallel to the base pan 14 of tray 12.

Figure 7B:
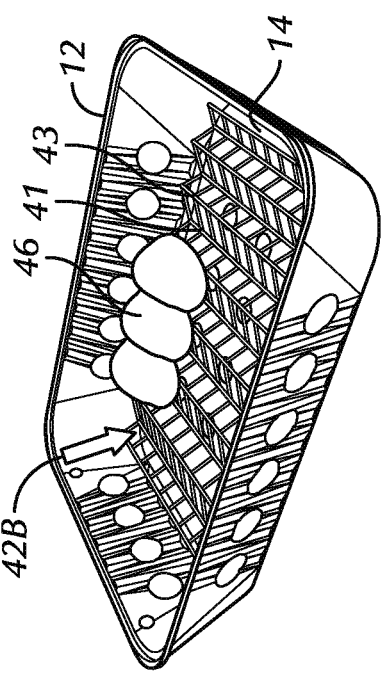
FIG. 7B is a perspective view of a second alternative component for assembly of a portable charcoal grill showing a second alternative lower metal support grill in accordance with one or more embodiments.

FIG. 7B is a perspective view of a second alternative component for assembly to form a portable charcoal grill 8, according to one or more embodiment. A lower metal support grill 42B is inserted into the tray 12 and positioned spaced above and substantially parallel to the base pan 14 of tray 12. The second alternative support grill 42B is beneficially formed with a plurality of bends forming troughs 41 and ridges 43. Edges of the charcoal briquettes 46 fit partially down into the troughs 41 and are supported and spaced apart by the ridges 43 between adjacent briquettes. The starter material 60 is also supported by the metal support grill 42B with air space between the base pan 14 and the ridges 41 to permit air flow from the air flow holes 20 and the charcoal briquettes 46.

Figure 8:
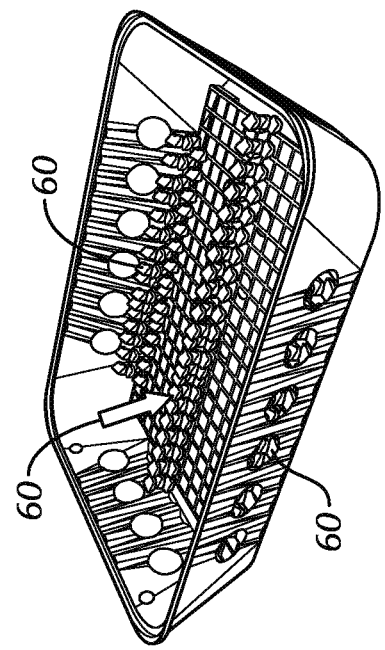
FIG. 8 is a perspective view of a component for assembly of a portable charcoal grill showing a starter material positioned within a portable charcoal grill in accordance with one or more embodiments.

FIG. 8 is a perspective view of a component for assembly, showing a starter material 60 positioned within the tray 12 for forming a portable charcoal grill 8 in accordance with one or more embodiments.

Figure 9:
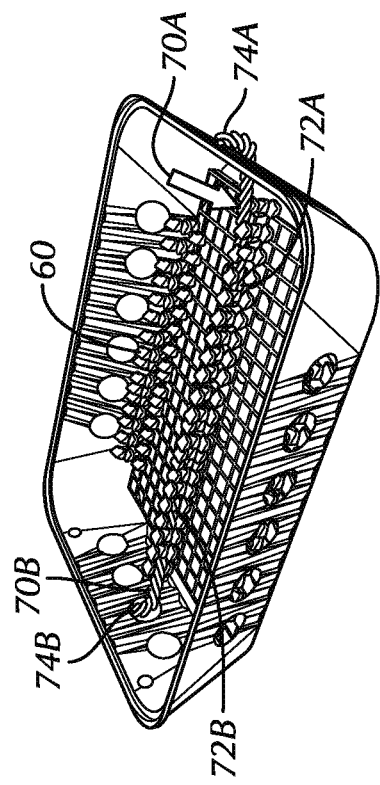
FIG. 9 is a perspective view of a component for assembly of a portable charcoal grill showing a first and a second ignition wick positioned within a portable charcoal grill in accordance with one or more embodiments.

FIG. 9 is a perspective view of a component for assembly to form a portable charcoal grill 8, according to one or more embodiment and showing a first ignition wick 70A and a second ignition wick 70B, positioned inserted through side walls 15 and extending into the area of starter support material 60 at either end of the tray 12.

Figure 10:
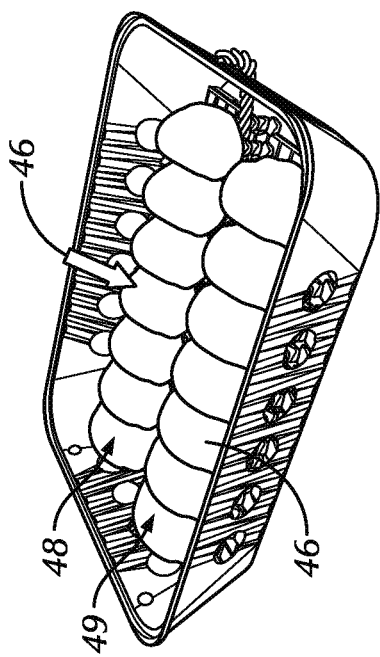
FIG. 10 is a perspective view of a component for assembly to form a portable charcoal grill, according to one or more embodiment, and showing a plurality of charcoal briquettes inserted into a tray.

FIG. 10 is a perspective view of a component for assembly to form a portable charcoal grill 8, according to one or more embodiment, and showing a plurality of charcoal briquettes 46 inserted into the tray 12. The briquettes 46 are supported from on the support grill 42 and positioned in at least one row 48 between the opposed side walls 15. The at least one row 48 includes a plurality of briquettes 46, each briquette 46 having substantially vertical faces adjacent to each other briquette 46 in the row 48. In one or more embodiments the at least one row 48 includes one or more rows, such as a first row 48 and a second row 49 substantially parallel to each other and extending along and supported by the support grill 42 and by the support starting material packed around the briquettes 46 to hold them in the face-by-face positions.

Figure 11:
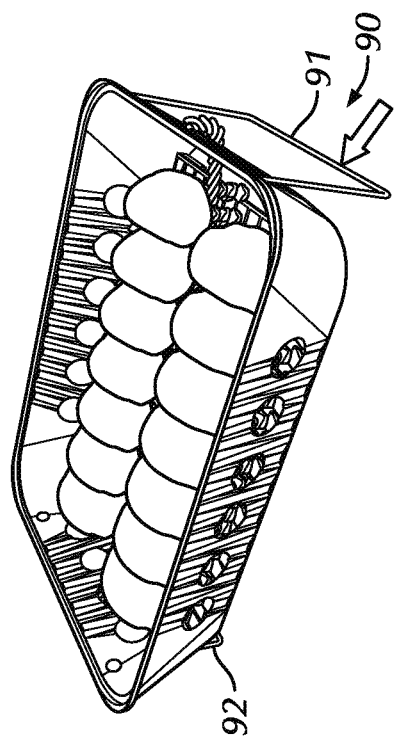
FIG. 11 is a perspective view of a component for assembly to form a portable charcoal grill 8, according to one or more embodiment, and showing a metal stand for holding the tray 12.

FIG. 11 is a perspective view of a component for assembly to form a portable charcoal grill 8, according to one or more embodiment, and showing a metal stand for holding the tray 12 and ultimately the portable charcoal grill 8, above a surface below the base 14. The stand 90 may include legs 91 and 92 at opposed sides walls of the tray 12 and may be used on an existing barbeque grill, or on the ground if an existing barbeque grill with appropriate air ventilation is not available to hold the portable barbeque grill, so that adequate air flow is permitted from below the base 14 of tray 12.

Figure 12:
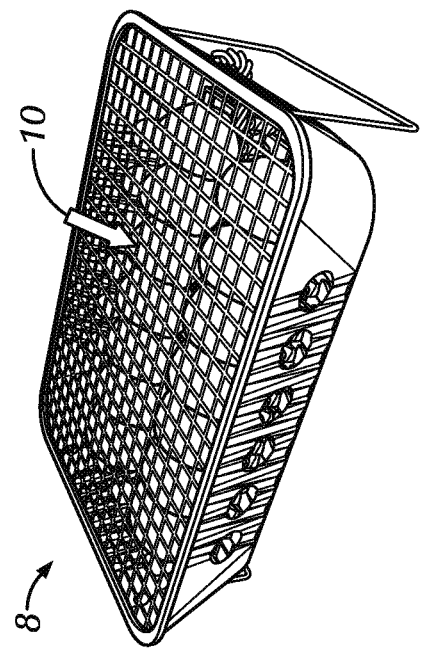
FIG. 12 is a perspective view of a component for assembly to form a portable charcoal grill, according to one or more embodiment, and showing a top cooking grill secured to the tops of side walls and showing a metal stand.

FIG. 12 is a perspective view of a component for assembly to form a portable charcoal grill 8, according to one or more embodiment, and showing a top cooking grill 10 secured to the tops of side walls 15 and all supported by metal stand 90 comprising legs 91 and 92.

FIG. 13 is an exploded assembly view showing the construction of a portable charcoal grill 8 in accordance with one or more embodiments. In the exploded view FIG. 13, the top grill 10 is shown in FIG. 13A. In FIG.B charcoal briquettes 46 are shown in one or more rows 48 and 49 of a plurality of briquettes 46. One or more wicks 70A and 70B are depicted in FIG. 13C with a portion 74A and 74B for extending outside of the tray 12 and a portion 72A and 72B for extending into the tray 12. FIG. 13D shows starter support material 60 that may, for example, comprise wood pieces, wood chips, or sawdust wood pellets or nodules. FIG. 13E shows a lower support grill 42 including a horizontal metal grate or grill and support projections 44 extending vertically from the grill portion for spacing the lower grill 42 above the base pan 14 of tray 12.

FIG. 13F is a perspective view showing a metal tray for the construction of a portable charcoal grill 8 in accordance with one or more embodiments. The metal tray 12 may beneficially be made of a light-weight metal such as aluminum.

FIG. 13G1 shows one alternative embodiment for a metal stand 90 that may comprise a plurality of legs 91, and 92 with connectable end portions for securely engaging with side walls 15 of the tray 12 to hold the base pan 14 above the ground or above another lower surface.

FIG. 13G2 shows another alternative embodiment for a metal stand 95 that may comprise a unitary metal wire stand having legs 96 and 97 spaced apart a distance for straddling opposed sides 15 for shipping the portable charcoal grill and then turning the stand 95 over to be placed under the base pan 14 to provide a space below the base pan 14, to permit air flow when the portable charcoal grill is used for cooking.

The above description presents only a few examples of a portable charcoal grill according to one or more embodiments of the portable charcoal grill 8, components, and construction. Other components, construction and methods of construction may be formed and performed using one or more embodiments of the invention without departing from the invention disclosed and claimed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A barbecue grill comprising:
   (a) a metal tray having a base pan;
   (b) sidewalls connected to the base pan and projecting upwardly from the base pan;
   (c) a plurality of airflow holes formed at spaced apart locations through the base pan;
   (d) a plurality of air vent holes formed through the sidewalls at spaced-apart locations;
   (e) a lower grill extending along and parallel to the base pan inside the upwardly extending sidewalls;
   (f) a plurality of charcoal briquettes, having substantially uniform size and shape, a charcoal ignition temperature, and a charcoal burning rate, wherein the plurality of briquettes are positioned, by a support grill having troughs and ridges, in at least one row of charcoal briquettes, and wherein the at least one row of charcoal briquettes extends between opposite sidewalls;
   (g) at least one ignition wick extending a length into the metal tray and adjacent to the at least one row of charcoal briquettes with a portion of the at least one ignition wick extending out of the metal tray, and wherein the at least one ignition wick has a wick-burning temperature higher than the charcoal ignition temperature;
   (h) a quantity of starter material packed around the charcoal briquettes to support the plurality of briquettes spaced-apart from each other in the at least one row and supporting the briquettes in a position spaced-apart from the sidewalls and above the support grill, wherein the starter material has a starter material ignition temperature lower than burning temperature of the wick and a burning temperature higher than the charcoal ignition temperature;
   (i) a cooking grill supported by the sidewalls substantially parallel to the base pan and positioned above the at least one row of charcoal briquettes and secured to the side walls above the starter material, the charcoal briquettes, and the lower grill of the metal tray.

* * * * *